United States Patent [19]
Cloyd

[11] 3,788,599
[45] Jan. 29, 1974

[54] PLUG VALVE
[75] Inventor: Harold S. Cloyd, Erie, Pa.
[73] Assignee: Nosco Plastics, Incorporated, Erie, Pa.
[22] Filed: June 28, 1972
[21] Appl. No.: 267,089

[52] U.S. Cl. ............... 251/181, 251/182, 251/309, 137/625.47
[51] Int. Cl. ............................................. F16k 5/02
[58] Field of Search 251/181, 182, 309; 137/625.47

[56] References Cited
UNITED STATES PATENTS
| | | | |
|---|---|---|---|
| 2,832,562 | 4/1958 | Myers | 251/175 |
| 3,612,091 | 10/1971 | Gramann | 251/312 |
| 2,854,027 | 9/1958 | Kaiser | 137/625.47 X |
| 3,678,960 | 7/1972 | Leibinsohn | 137/625.47 |
| 3,185,179 | 5/1965 | Harautuneian | 251/181 X |
| 2,412,597 | 12/1946 | Brewer | 251/181 |
| 3,484,077 | 12/1969 | Porter | 251/181 |
| 3,012,752 | 12/1961 | Buck | 251/309 |

Primary Examiner—Harold W. Weakley
Attorney, Agent, or Firm—Ralph Hammar

[57] ABSTRACT

A plastic plug valve for use in equipment for administering intravenous solutions and the like in which the plug is cammed into sealing engagement with the bore in the body by spring fingers preferably integral with the plug. The valve is intended to be used once and thrown away because the cost of washing and sterilization is greater than the cost of the valve.

4 Claims, 4 Drawing Figures

PATENTED JAN 29 1974 3,788,599

PLUG VALVE

This invention is a molded plastic plug valve in which the plug is cammed into sealing engagement with the bore in the valve body by spring fingers which are preferably integral with one end of the plug.

Figure 1:
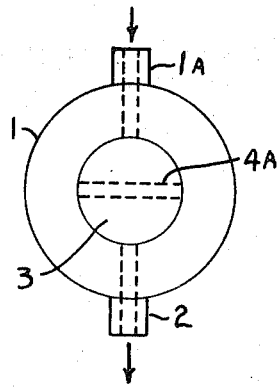
FIG. 1 is a diagrammatic view of the plug valve for controlling one fluid.

In FIG. 1 the valve body member 1 has an inlet way 1a and an outlet way 2. Fluid flow is controlled by a plug member 3 rotatable in the body and having a way 4a which when rotated into register with the ways 1a and 2 allows the fluid to flow from the inlet way 1a to the outlet way 2.

Figure 2:
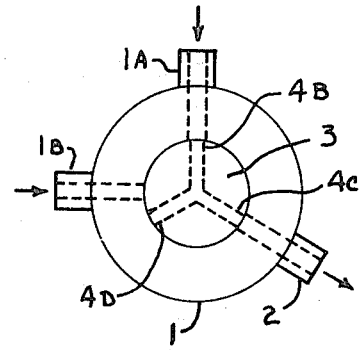
FIG. 2 is a diagrammatic view of a valve for controlling two fluids.

In FIG. 2 the body 1 has inlet ways 1a and 1b and an outlet way 2. The plug 3 has a way 4b which may be rotated into register with either inlet way 1a or 1b and has outlet ways 4c and 4d which respectively register with the outlet way 2 when the way 4b registers with the ways 1a and 1b. The valves shown in FIGS. 1 and 2 are illustrative of standard plug valve design. These figures indicate fluid flow as distinguished from valve construction.

Figure 3:
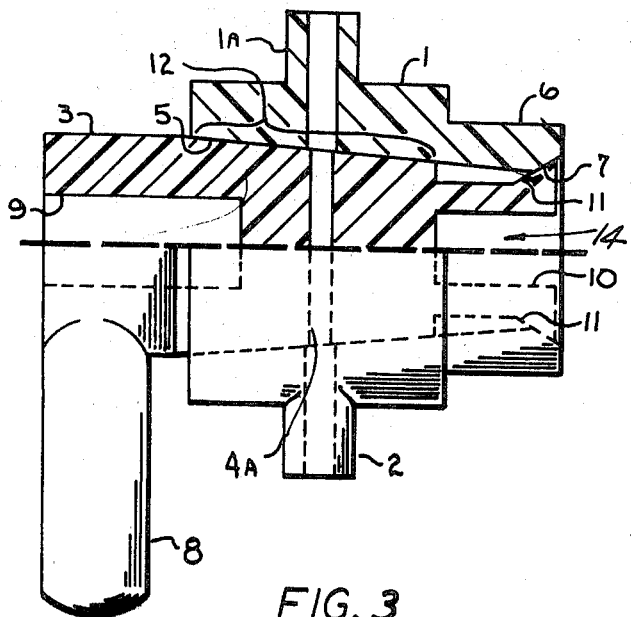
FIG. 3 is a side elevation of a preferred valve with the upper half in section.
Figure 4:
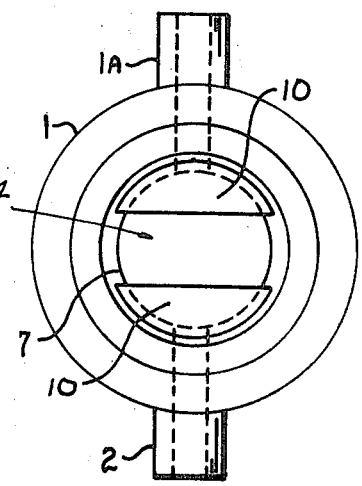
FIG. 4 is an end view of the FIG. 3 valve.

In FIGS. 3 and 4 the valve body 1 has an inlet way 1a and an outlet way 2 as shown in FIG. 1. At the center of the valve body is an axially extending tapered bore 5 which extends substantially the full length of the body and terminates within an axial extension 6 having an inwardly inclined annular wedge surface 7 at its outer end. The plug 3 which is rotatable in and complementary to the tapered bore 5, has a diametrically extending way 4a which may be rotated into and out of register with the ways 1a and 2. At one end the plug is provided with a handle 8. A cored out recess 9 at the handle end of the plug reduces the required amount of plastic. The end of the plug opposite the handle has a slot 14 extending axially inward to separate adjacent axially extending spring fingers 10 which terminate in outwardly inclined arcuate or annular wedge surfaces 11 complementary to the wedge surfaces 7 of the body. The portions of the plug 3 which project axially beyond the bracket 12 respectively carry the handle 8 and the cam surfaces 11. The angular extent of each cam surface 11 is less than 180°. The spring fingers 10 are axially extending protrusions supported only at one end by having one end integral with the plug, or in other words by being cantilevered to the plug. Each cam surface 11 is on the unsupported end of a finger. Each finger and its cam surface is angularly spaced from the adjacent finger and its cam surface.

As the plug is pressed into the tapered bore 5 of the valve body, the outer ends of the spring fingers 10 are radially compressed or deflected by engagement with the bore. Upon reaching the assembled position shown in FIG. 3, the outer ends of the spring fingers snap over the wedge surfaces 7 on the valve body. The compression is only partially relieved in the assembled position. Because the spring fingers are cantilevered to the valve plug 3, the compression develops a radially outward force which is transmitted from the cam surfaces 11 on the spring fingers to the cam surface 7 on the valve body. The radially outward force between these cam surfaces develops an axial force in the direction to pull the plug into sealing engagement with the tapered bore in the valve body, thereby developing a seal throughout the length of the bore designated by bracket 12. In the particular structure illustrated the spring fingers 10 are on opposite sides and spaced outward from the axis of the bore and have one end integral with the plug and the other end extending toward the small end of the bore 5 and the axial force is in the direction to move the plug 3 relative to the body 2 toward the small end of the bore. The cam action between the surfaces 7 and 11 makes the seal independent of manufacturing tolerances. The seal is also independent of the angular position of the plug.

The valve is adapted to injection molding from one of the inert plastics such as polyethylene. The cost is lower than the cost of washing and sterilizing, so the valve can be used once and thrown away, thereby avoiding all danger of cross contamination between patients.

The axial sealing force between the plug and body is determined by the difference in the as molded diameters of the interengaging cam surfaces 7 and 11. Increasing the difference results in greater deflection of the spring fingers with corresponding greater sealing force.

What is claimed is:

1. A valve having plug and body members each comprising a single piece of molded plastic, said body member having a tapered bore and inlet and outlet ways leading to said bore, said plug member being rotatable in and complementary to said bore and having a way brought into and out of register with said inlet and outlet ways by relative rotation of said members, means having interengaging cam surfaces on said members of annular configuration of different as molded diameters coaxial with said bore for exerting an axial force moving the plug member axially relative to the body toward the small end of said bore, one of said cam surfaces having an angular extent less than 180° and being on an axially extending spring finger, said finger being supported only at one end by having said one end integral with and cantilevered to one of the members, said one of said cam surfaces being on the unsupported end of the finger, said one end of the finger being axially spaced from said one of said cam surfaces, and the other cam surface being on the other member and deflecting said finger by reason of the difference in the as molded diameters of said interengaging cam surfaces.

2. The valve of claim 1 in which said one member is the plug member.

3. The valve of claim 2 in which said spring finger extends toward the small end of the bore.

4. The valve of claim 3 in which there are a plurality of said fingers, each with one of said cam surfaces on its unsupported end, said fingers and their cam surfaces being angularly spaced from each other, each said finger being spaced radially outward from the axis of the bore and extending from the plug member toward the small end of the bore and in which an axially extending slot in the plug member separates each said finger and its cam surface from the adjacent said finger and its cam surface.

* * * * *